US012498905B1

(12) United States Patent
Chen et al.

(10) Patent No.: US 12,498,905 B1
(45) Date of Patent: Dec. 16, 2025

(54) CLIENT AND TEST CODE GENERATION OF ENCODED SECURITY POLICIES

(71) Applicant: Zoom Video Communications, Inc., San Jose, CA (US)

(72) Inventors: Jinhua Chen, Hefei (CN); Hao Hu, Hefei (CN); Tao Li, Hefei (CN); Di Qi, Hefei (CN); Wudi Tang, Hefei (CN); Shicheng Yu, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 231 days.

(21) Appl. No.: 18/385,691

(22) Filed: Oct. 31, 2023

(51) Int. Cl.
*G06F 8/30* (2018.01)

(52) U.S. Cl.
CPC ........................ *G06F 8/30* (2013.01)

(58) Field of Classification Search
CPC .............................................. G06F 8/30
USPC ................................. 717/106–114, 124–127
See application file for complete search history.

(56) References Cited

U.S. PATENT DOCUMENTS

| 9,195,833 | B2* | 11/2015 | Chestna | G06F 11/36 |
| 9,398,257 | B2* | 7/2016 | Weber | H04N 7/148 |
| 9,521,166 | B2* | 12/2016 | Wilson | H04L 63/20 |
| 10,869,001 | B2* | 12/2020 | Periyannan | H04N 7/148 |
| 11,977,476 | B2* | 5/2024 | Bansal | H04L 63/1433 |
| 2018/0358117 | A1* | 12/2018 | Neagle | A61B 5/0015 |
| 2019/0132350 | A1* | 5/2019 | Smith | G06F 21/60 |

OTHER PUBLICATIONS

Aouadi et al., "Testing Security Policies for Distributed Systems: Vehicular Networks as a Case Study", 2014, International Journal of Computer Science Issues, pp. 68-77. (Year: 2014).*
Phung et al., "HybridGuard: A Principal-based Permission and Fine-Grained Policy Enforcement Framework for Web-based Mobile Applications", 2017, IEEE, pp. 147-156. (Year: 2017).*
Webex by Cisco, "Security advantage for Webex", 2021, Cisco, 24 pages. (Year: 2021).*

* cited by examiner

*Primary Examiner* — Ted T. Vo
(74) *Attorney, Agent, or Firm* — Kilpatrick Townsend & Stockton, LLP

(57) ABSTRACT

Techniques for client and test code generation of encoded security policies are provided. In an example method, a computing device configured for code generation receives a serialized representation of a network location based on a specification of an application programming interface (API) associated with the network location. The specification includes one or more security policies associated with the network location. For each of the one or more security policies, the computing device encodes instructions for complying with the security policy and generates client code for sending a request to the network location, including the encoded security policy compliance code, and client code for receiving a response. The computing device also generates client code for testing the generated client code including instructions to verify compliance with the one or more security policies and outputs the generated program and test code.

20 Claims, 9 Drawing Sheets

```
{
    "class_name" : "TestRequest",
    "request": {
        "header" : {
            "meetingId" : "mock meetingId"
            "meetingNumber" : "mock meetingNumber"
        },
        "form_data":{
            "name": "John Doe",
            "email": "johndoe@example.com"
        },
        "http_settings":{
            "domain":"video-conference-provder.com",
            "path": "user/api/setting/save1",
            "method": "post"
        }
    },
    "response": {
        "header":{}
        "body":{
                "protocolfile" : "meeting.proto",
                "fields": [
                    "Response.result",
                    "Response.profile.room"
                ]
        }
    },
    "security_policy":{
        "add_org_cookie": false,
        "need_check_session_expired": true,
        "follow_same_origin": true,
        "need_prompt_cert": true,
    }
}
```

FIG. 6

CLIENT AND TEST CODE GENERATION OF ENCODED SECURITY POLICIES

FIELD

The present application generally relates to application development and testing, and more particularly relates to client and test code generation of encoded security policies.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 shows an example of a specification of a network location, according to some aspects of the present disclosure.

DETAILED DESCRIPTION

Figure 1:
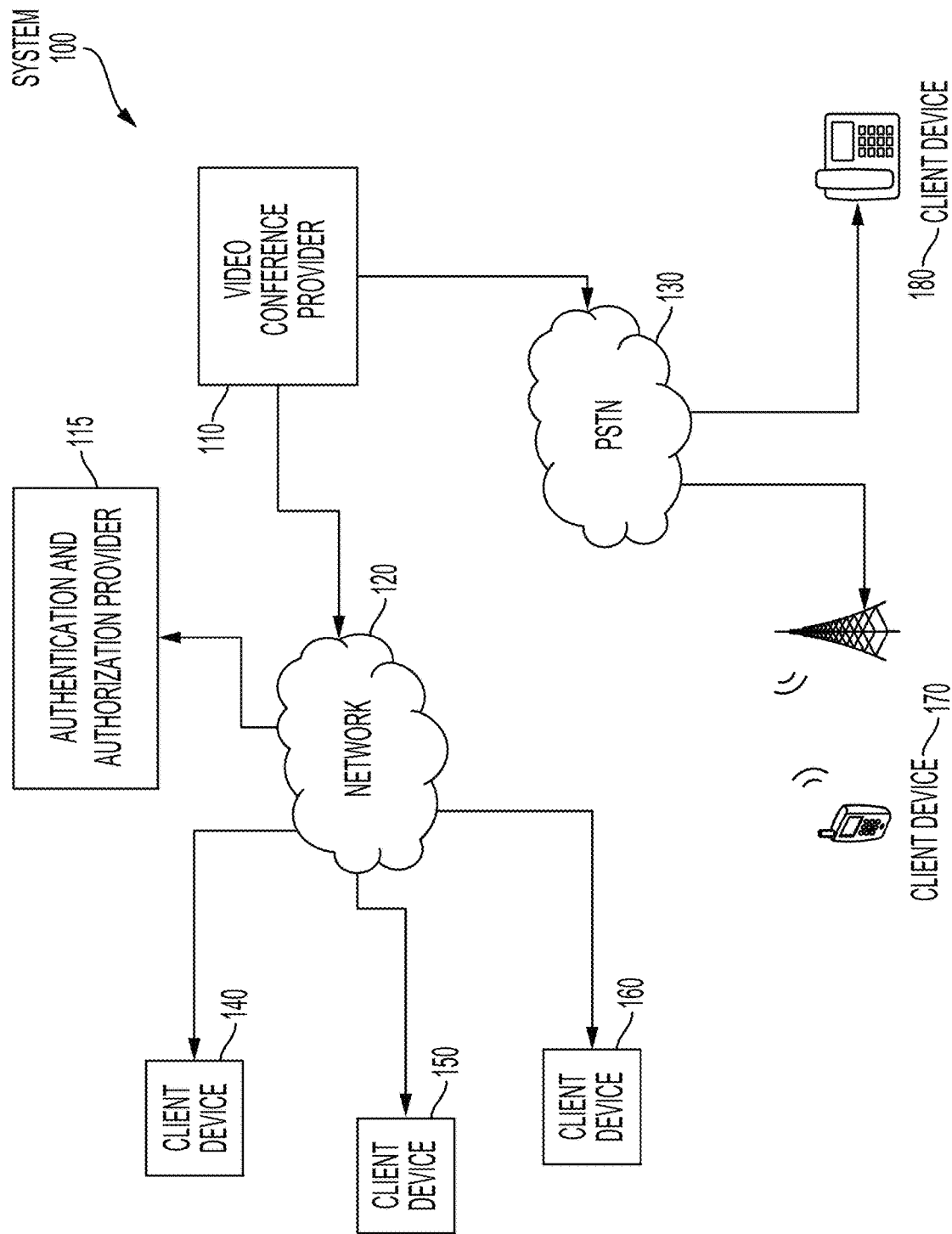
FIG. 1 shows an example system that provides videoconferencing functionality to various client devices, according to some aspects of the present disclosure.

Examples are described herein in the context of techniques for client and test code generation of encoded security policies. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Between the proliferation of high-bandwidth networks and the pressure applied to modernize enterprise workflows during the recent pandemic, video conferencing continues to become a more significant part of the fabric of our modern, connected world. The maintainers of video conference providers are challenged by the need to rapidly respond to changing requirements or software issues that can affect the ability of many users to communicate. Thus, rapid, secure application development and maintenance is an important aspect of operating a video conference provider.

However, application development and maintenance can be slowed by, for example, repetitive tasks, even when such tasks constitute elements that are common across an organization. For example, a video conference provider that provides an application programming interface (API) for accessing provider services may require standard elements for all API requests available to application developers. Additionally, organizations providing video conferencing services may have stringent and complex security requirements that place significant burdens on the developers of API clients who may not even be privy to the implementation details of the security requirements.

Moreover, application development and maintenance are typically performed in parallel with tests to ensure the correct and secure operation of API client software even as backend or environment conditions change. For example, development of API client code for a new API endpoint may be accompanied by the development of unit, functional, or integration tests, among other types of software tests. Such tests may cover a standard range of input conditions and environments. Importantly, such tests may also test the correct and secure implementation of the video conference provider's security requirements or policies. As with the development of the client code, the associated test code may include standard elements common to all API requests made in the context of a particular organization or application context as well as a standardized regime of security requirements.

Techniques for client and test code generation of encoded security policies are provided that can generate client and test instructions for API clients including encoded client code that enforces compliance with the security policies. The following non-limiting example is provided to introduce certain embodiments. In this example, a computing device configured for code generation first receives a serialized representation of a network location, in which the serialized representation is based on a specification of an application programming interface (API) associated with the network location.

For example, the network location may the endpoint of a web-based hypertext transfer protocol (HTTP) API. The specification may include information about accessing the network location to send or receive data, initiate a service, authenticate a user, and so on. The serialized representation may be a standard, semi-structured, machine-readable format used for data interchange such as the JavaScript Object Notation (JSON). The serialized representation can be generated based on the specification either manually, by an application developer, or by the computing device.

The specification includes one or more security policies associated with the network location. For example, a web-based API endpoint may require the presence of certain authentication information in incoming HTTP headers. The authentication information may be required to be generated according to security policies specified by the organization that administrates the web-based API. In another example, the security policy may require the implementation of a "same-domain" policy. A same-domain policy may, for example, restrict API clients from making requests that contain sensitive information such as authentication information to domains not specified as safe. Security policies may be designated in the serialized representation using a Boolean flag, custom script code, macros, and so on.

Next, for each of the one or more security policies, the computing device encodes instructions for complying with the security policy. For example, a requirement for inclusion of particular headers that are compliant with a security policy (e.g., digitally signed cookies or containing an authentication string or token) can be encoded to a format suitable for embedding into generated client code. For instance, if client code for implementing compliance with a same-domain security policy will be implemented using C++, the computing device can encode the instructions for compliance into the appropriate C++ client code.

The computing device then generates client code for sending a request to the network location, including the encoded security policy compliance code for each of the one or more security policies. In this context, "client code" refers generally to program code or executable instructions for communication with APIs located at remote network locations. Such code can be incorporated into other applications or client code or executed independently.

For example, the computing device may generate C++ client code for inclusion in an HTTP client application that can be used for making a request to a web-based API. The client code may be generated by applying the information contained in the serialized representation to a template. The client code may include instructions for sending an HTTP request with certain characteristics (e.g., HTTP method, headers, path, data, etc.) to a particular uniform resource locator (URL). Continuing the example from the previous paragraph, the encoded C++ instructions for complying with the security policies can be embedded into the generated C++ client code. For instance, generated C++ client code may include an HTTP client class. The encoded C++ instructions for complying with the security policies can be included using an interceptor class or other similar means for executing client code before the HTTP client sends a request to the network location.

The computing device also generates client code for receiving a response from the network location responsive to the request. For example, in addition to the instructions for sending an HTTP request, the generated client code may also include instructions for receiving, parsing, or processing of an HTTP response from the web-based API. The response may be in a particular specified format, such as a binary, serialized format. The generated client code may be used to receive the HTTP response in the specified format and provide access to the data contained therein by application developers.

Finally, the computing device generates test code for testing the generated application client code. In this context, "test code" refers generally to program code or executable instructions for testing other program code. For example, various functions of the generated client code can be mirrored in generated test code for verification of proper operation. For instance, if generated client code contains instructions to make a request to an HTTP endpoint with a particular header specified, client code for testing can be generated that includes a unit test that verifies that when the request to the HTTP endpoint is made, the particular header is specified. Likewise, the client code for testing can be used to verify compliance with the one or more security policies. For instance, a unit test can be generated that verifies compliance with the same-domain security policy when particular HTTP endpoints are used.

The computing device then outputs the generated client code. For example, the generated client code may be saved to a memory device, printed, emailed, or otherwise conveyed to an application developer. The application developer can use the generated client code for rapid, secure application development that is compliant with the standards and security policies of a particular network location such as the organization administrating a web-based API. For instance, a video conference provider may provide a web-based API for use by application developers. The techniques described above can distributed to application developers and used to generate client code for standardized and secure access to the web-based API for all clients accessing the API.

The innovations of the present disclosure provide significant improvements in the technical field of application development and testing. As described above, the techniques described here can be used for the generation of client code for using APIs that can ensure standardization across and organization and can further mandate or enforce secure access to the APIs. Such an approach to application development improves the utilization of computing resources, such as processing power and memory, in several ways. First, because generated client code need only be generated once for a particular network location configuration and set of security policies, consumption of processing resources in both code generation and resources used by developers performing the repetitive task of rewriting already-written code is saved. Second, standardized client code can be optimized by, for example, the authors of the templates used for code generation. For instance, generated client code can be optimized to share resources, use less memory, cache frequently-used objects, and so on. Computing resources can thus be conserved en masse through the use of optimized client code across entire organizations or among API user bases. Third, the generation of client code that mandates compliance with security policies may cause fewer security breaches and other issues, thus improving security and reducing the computing power, time, and resources lost to combating preventable security incidents. Fourth, the generation of client code for testing can help ensure that generated client code is adequately and continuously testing. This can contribute to the proper operation of optimized and secure code and overall reduce the consumption of computing resources lost due to preventable bugs and security holes, troubleshooting, and redress.

These illustrative examples are given to introduce the reader to the general subject matter discussed herein and the disclosure is not limited to these examples. The following sections describe various additional non-limiting examples of techniques implementing client and test code generation of encoded security policies.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
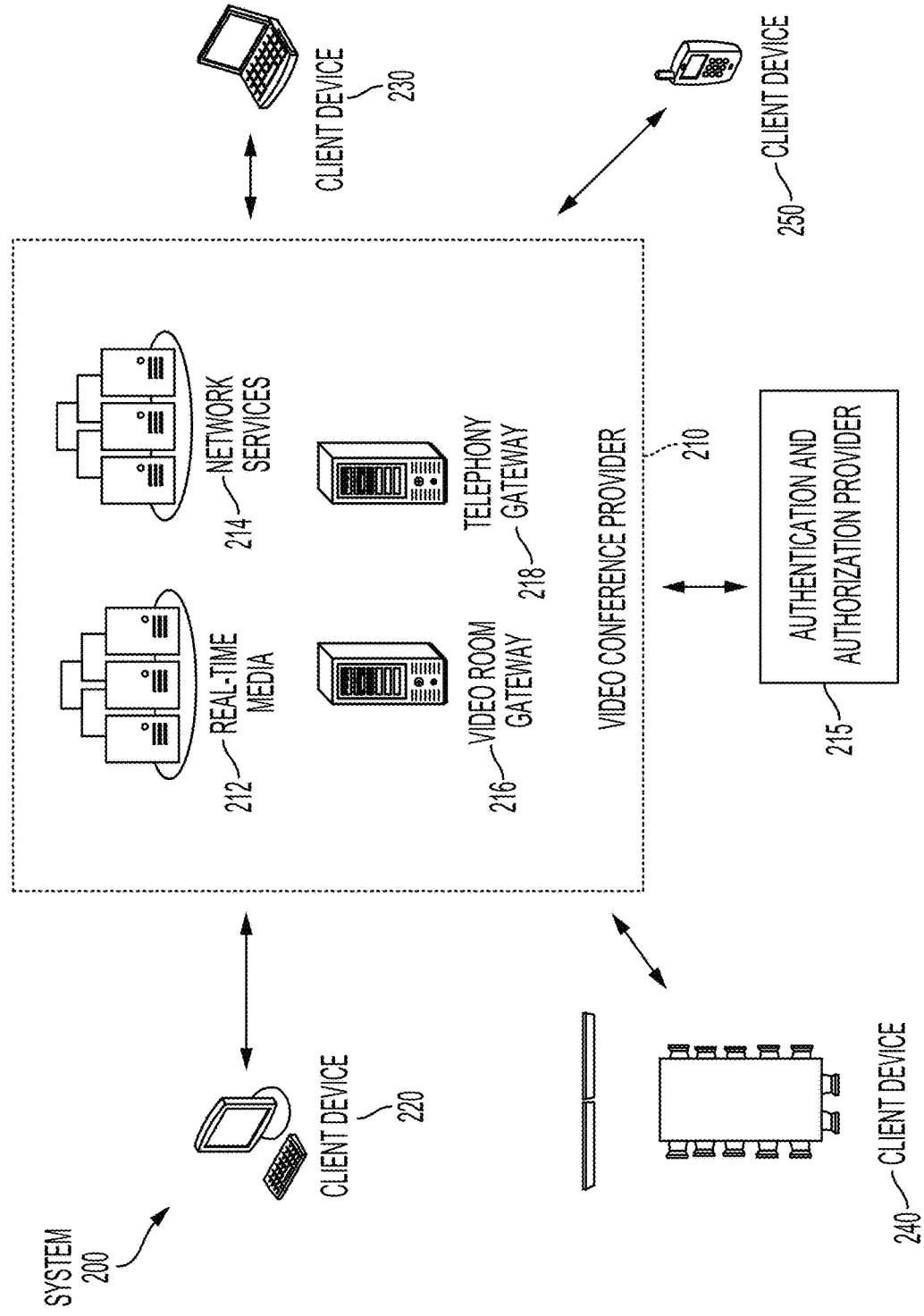
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
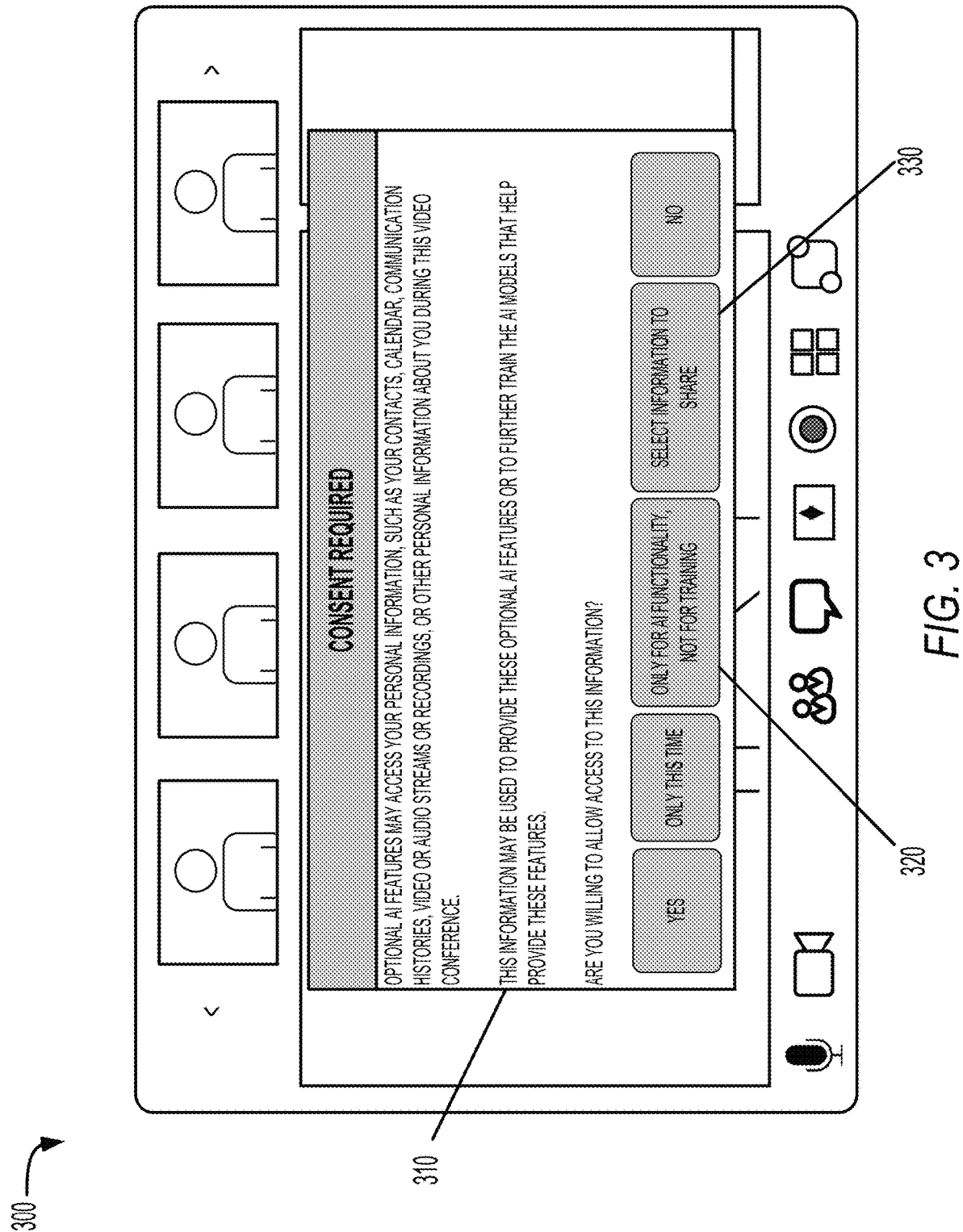
FIG. 3 shows an example user interface that may be used in some example systems configured for client and test code generation of encoded security policies, according to some aspects of the present disclosure.

Turning next to FIG. 3, FIG. 3 shows an example user interface 300 that may be used in some example systems configured for client and test code generation of encoded security policies. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
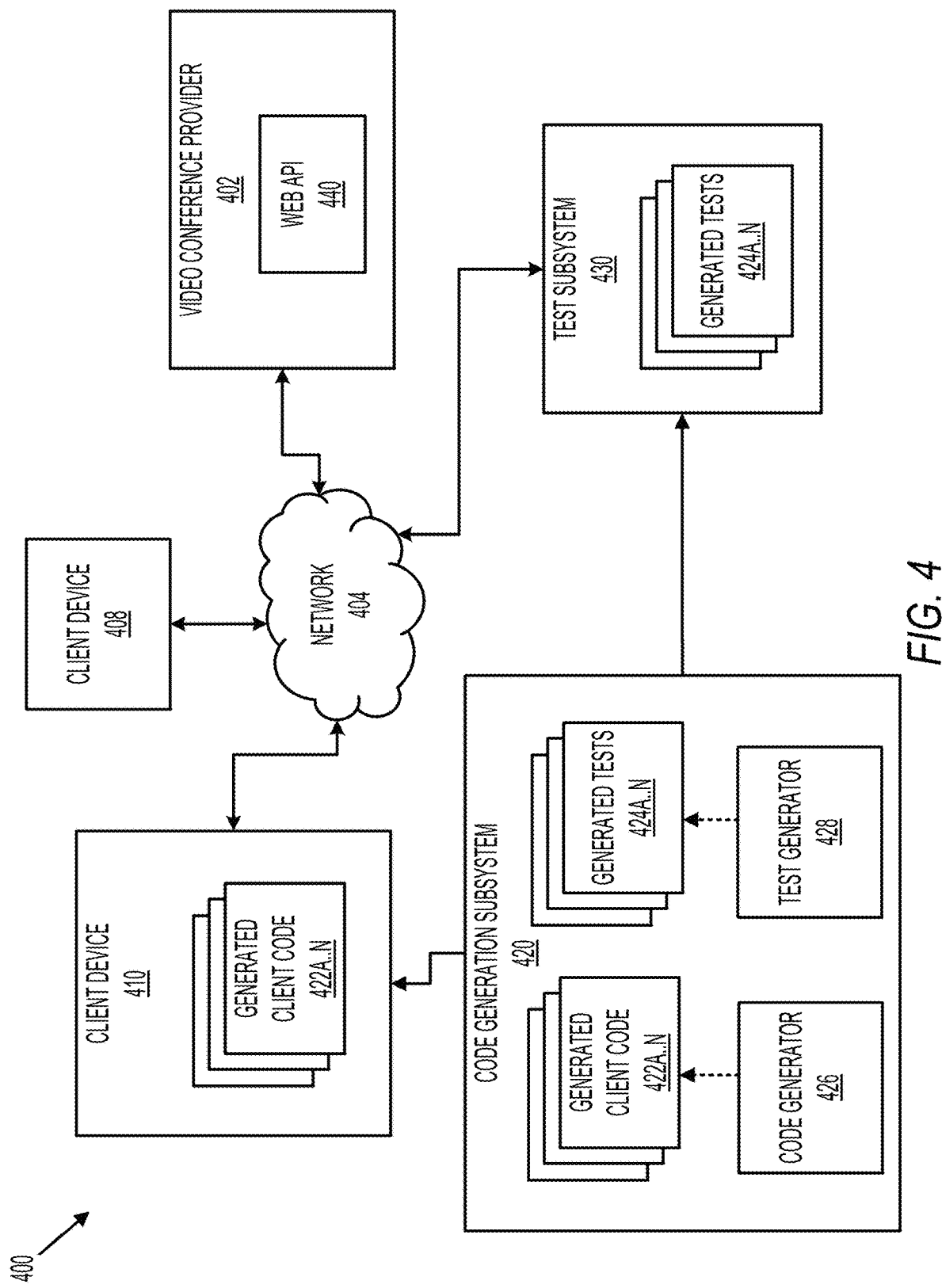
FIG. 4 shows an example of a system that implements client and test code generation of encoded security policies, according to some aspects of the present disclosure.

Referring now to FIG. 4, FIG. 4 shows an example of a system 400 that implements client and test code generation of encoded security policies. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the client code generated using the techniques for client and test code generation of encoded security policies disclosed herein. For example, client devices 408, 410 can execute video conferencing client software that can be used for accessing services provided by video conference provider 402 such as video conferencing, chat, calendaring, and so on. As will be described, tested and secure code client code can be generated for accessing APIs used during the operations of the aforementioned services. Such generated client code can be easily integrated into the video conferencing client software, speeding development time, reducing bugs, and mitigating security risks. For example, video conference provider 402 may include a web API 440. Web API 440 may be accessed using the HTTP protocol for sending and requesting data used during the operation of video conferences by the client devices 408, 410.

The system 400 includes a code generation subsystem 420 and a test subsystem 430. The code generation subsystem 420 includes components for generating secure client code 422A . . . N and associated test code. For example, the code generation subsystem 420 may be a server, collection of servers, or cloud compute resources used for generation of client code according to various configurations and specifications. In some examples, the code generation subsystem is a component of the video conference provider 402. Configuration and specifications may be provided by way of manual input using a suitable client device, files, or other means.

The code generation subsystem 420 includes a code generator 426. The code generator 426 can receive a serialized representation of a network location. The serialized representation is based on a specification of an API associated with the network location. In some examples, the specification of the API may be automatically generated using a suitable component. For instance, a specification generation component (not shown) can be used to examine an API specification or documentation to generation the specification. In another example, a specification generation component can be used to "crawl" an API to obtain metadata that can be used to generate a specification.

The serialized representation may be a standard, semi-structured, machine-readable format used for data interchange such as the JavaScript Object Notation (JSON), extensible markup language (XML), and so on. The serialized representation may also be a non-human readable binary format.

The network location may be the endpoint of web API 440 identified and located using a unique URL. A typical network location specified by URL may be "https://video-conference-provider.com/api/v2/conference/audio". The specification may include additional parameters relevant for accessing the API at this network location may include HTTP method, query parameters, HTTP headers, path, authentication tokens, payload format, response format, timeout settings, API version, rate limits, content type, cache settings, accept encoding, date stamp, user agent, redirection policies, SSL/TLS settings, proxy settings, connection keep-alive, or error handling rules, among other possibilities. This list includes examples specific to the HTTP protocol but its not intended to be limiting. One of ordinary skill in the art will appreciate that other types of APIs may be specified, including Remote Procedure Call (RPC), Simple Object Access Protocol (SOAP), GraphQL, or WebSockets, among others.

The specification includes one or more security policies associated with the network location. For instance, the specification may include security polices relating to the inclusion of certain cookies for particular domains (e.g., the portion of a URL that identifies an organization or other entity on a network) or same-domain policies. In another example, the security policy may require the implementation of a "same-domain" policy. A same-domain policy may, for example, restrict API clients from making requests that contain sensitive information such as authentication information to domains not specified as safe.

A non-exclusive list of typical security policies that may be specified in some implementations include SSL/TLS encryption enforcement, certificate pinning, HTTP Strict Transport Security (HSTS) enforcement, Cookie secure and HttpOnly flags, token-based authentication, rate limiting, Content Security Policy (CSP) for API responses, Cross-Origin Resource Sharing (CORS) restrictions, User-agent whitelisting, request signature verification, Referrer Policy, JSON Web Token (JWT) validation, API Key requirements and validation, IP Whitelisting, endpoint deprecation policies, among others. Again, one of ordinary skill in the art will recognize a multiplicity of variations.

Security policies may be designated in the serialized representation using a Boolean flag, custom script code, macros, and so on. For example, the specification may require the use of a particular security policy through a flag in a JSON specification such as "'follow same_origin":true'. In another example, the specification may include a code block in a particular scripting language, such as Lua or Groovy, specifying the implementation of a security policy.

For each of the one or more security policies specified, the code generator 426 can encode instructions for complying with the security policy. For example, where a particular security policy in specified using a Boolean flag, the code generator 426 may determine the appropriate context and encode the specified security policy into client code. For instance, the code generator 426 may determine that the generated code is to be Java code based on a suitable configuration, that the network location is a web-based API such as web API 440, and that a specified security policy is to be implemented as an interceptor callback during HTTP client operations. An interceptor callback may include custom instructions that will be executed by an HTTP client before making a web request. In this example, the code generator 426 encodes the specified security policy into Java instructions that are suitable for use in an interceptor callback.

In another example, where the security policy is specified using instructions in a code block, the instructions in the code block may need to be encoded into a format suitable for execution. For instance, if the generated client code is configured to be C++ code and the security policy is specified using the Lua scripting language, the Lua code block may be encoded into a format for embedding into C++ code, such as execution of an inline script.

The code generator 426 can generate client code 422A . . . N for sending a request to the network location including the encoded security policy compliance code for each of the one or more security policies. Likewise, the code generator 426 can generate client code 422A . . . N for receiving a response from the network location responsive to the request. For example, the code generator 426 may be configured to generate HTTP client code 422A . . . N for enabling a client device 408, 410 to communicate with the video conference provider 402 using a specified programming language. For instance, if the output programming language is configured to be Java, the code generator 426 may output one or more client classes that can be easily integrated into a Java application.

The generated client code 422A . . . N may contain the encoded security polices that will be implemented by virtue of using the generated client code 422A . . . N for communicating with web API 440. The generated client code 422A . . . N may also include client code corresponding to the rest of the request specification including HTTP method, path, headers, and so on in the programming language of choice. The generated client code 422A . . . N may also include a portion for receiving, processing, and utilizing the response. For instance, a particular response format can be specified in the serialized representation of the specification, which may result the generation of client code that receive an HTTP response and then deserializes, parses, decrypts, or performs other suitable operations, and exposes the response using a suitable Java client class or other programming construct.

The code generation subsystem 420 includes test generator 428. The test generator can generate test code 424A . . . N for testing the generated client code including instructions to verify compliance with the one or more security policies. For example, the test generator 428 may receive an appropriate configuration, such as a specified programming language, and then generate unit, functional, or integration tests (among others) that can be used to verify the proper operation of the generated request and response handling client code.

Importantly, the generated test code 424A . . . N may also include explicit tests of the one or more security policies and compliance therewith. For instance, if a same-domain security policy is included in the specification, unit tests may be generated that both verify that the same-domain policy is complied with during same-domain web requests as well as different-domain web requests to ensure coverage of all possible execution branches. Unit or functional tests may provide coverage of a variety of such scenarios. Likewise, integration tests may be generated to verify proper operation and security policy compliance in live, testing environments or production environments.

The code generator 426 and test generator 428 may include templating engine for the generation of client code 422A . . . N and test code 424A . . . N. For example, the information included in the specification can be applied to a suitable template by the templating engine to generate the client code 422A . . . N and test code 424A . . . N. The templating engine in the code generator 426 and test generator 428 will be shown in more detail in FIG. 5 below.

The code generator 426 and test generator 428 may outputting the generated client code 422A . . . N and test code 424A . . . N, respectively, in a format suitable for inclusion in other application code. For example, the code generator 426 may output the generated client code 422A . . . N as a number of class files or other client code files that can be integrated into another application. The generated client code may then be executed by client device 410, as shown, as part of, for example, video conferencing software.

In another example, the test generator 428 may output the generated test code 424A . . . N as a number of class files or functions that can be integrated into an existing test suite. Alternatively, the generated test code 424A . . . N may be output in a format that can executed as standalone tests, given suitable configuration. The generated test code 424A . . . N may be executed by a test subsystem 430. For example, the test subsystem 430 may be a server, collection of servers, or cloud compute resources used for testing application code. In some examples, the test subsystem 430 can be a component of the video conference provider 402. The test subsystem 430 may be configured to execute tests against the generated client code 422A . . . N or an application that includes it.

Figure 5:
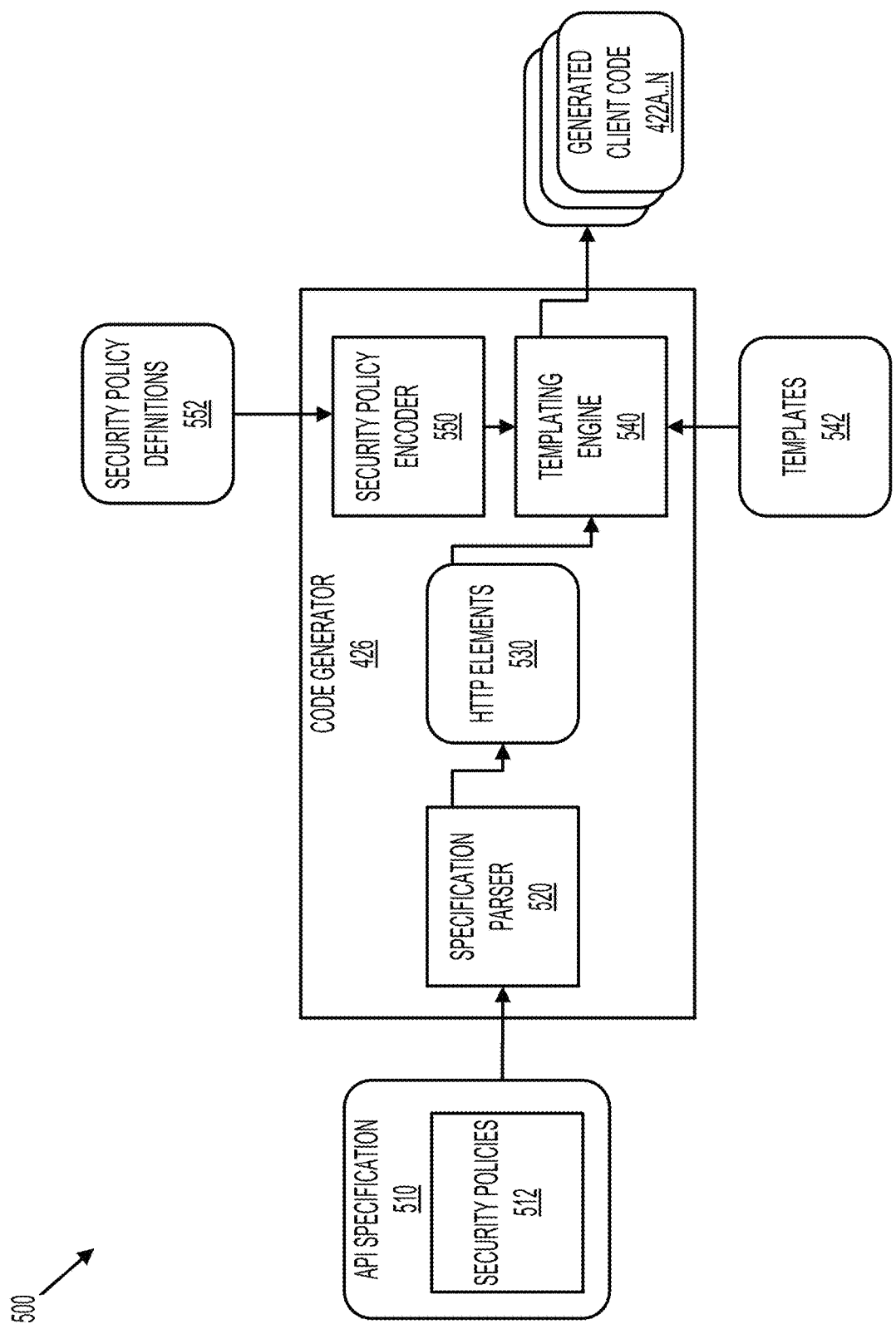
FIG. 5 shows an example of a system that implements client and test code generation of encoded security policies, according to some aspects of the present disclosure.

Referring now to FIG. 5, FIG. 5 shows an example of a system 500 that implements client and test code generation of encoded security policies. System 500 shows a detail view of an example implementation of code generator 426, although the concepts described in this section apply equally to the test generator 428.

Code generator 426 includes a specification parser 520 that receives an API specification 510 in the form of a serialized representation such as JSON. In example system 500, specification parser 520 generates HTTP elements 530 for a web-based API such as web API 440 in FIG. 4. However, the specification parser 520 may use the specification to generate elements suitable for population of templates 542 for other API types such as SOAP, WebSockets, RPC, and so on. HTTP elements 530 may include elements for populating client code templates 542 for HTTP requests such as HTTP headers, cookies, path, form data, and so on. The HTTP elements 530 may be in the form of a data structure suitable for application to templates 542 such as an associative array, hashmap, dictionary, and so on.

The specification may also include a portion for receiving, processing, and utilizing the response. For instance, a particular response format can be specified in the serialized representation of the specification, which may result the generation of client code 422A . . . N that receive an HTTP response and then deserializes, parses, decrypts, or performs other suitable operations, and exposes the response using a suitable Java client class or other suitable abstraction. For instance, the specification may identify the response format as a binary, serialized format such as protobuf. Protobuf is a language-neutral extensible mechanism for serializing structured data into a binary format for efficient transmission. However, the response may also take the form of human- and machine-readable semi-structures formats such as JSON, XML, and others.

The code generator includes a templating engine 540. The templating engine 540 may be one of, for instance, a large variety of available commercial or open-source templating engines such as Jinja, ERB, Blade, ASP NET Razor, Mustache, Handlebars, Pug, Thymeleaf, Liquid, or Twig, among many others. In general, the templating engine 540 receives templates 542 corresponding to the necessary client code and the HTTP elements 530. The templates 542 include portions designated for substitution, typically using a key-value approach. For instance, a template may include a particular portion such as "{{http_method}}". If the HTTP elements 530 include an element that expresses a key-value relationship between the key "http_method" and value "GET", then the value "GET" can be applied to the portion labeled "{{http_method}}". This is a simple example provided to disclose certain concepts relating to client and test code generation of encoded security policies. Many variations and additional complexity and functionality are possible and, indeed, typical.

Code generator 426 also includes security policy encoder 550. The security policy encoder 550 receives security policy definitions 552 that include information for encoding security policies that are specified or otherwise referenced in the specification. For example, where the specification specifies a requirement for certain security policies at a given network location using a Boolean flag, the code generator security policy encoder 550 may determine the appropriate context and encode the specified security policy into client code based on the security policy definitions 552. The appropriate context may be provided to the code generator 426 and security policy encoder 550 using, for example, a configuration file, but it can also be inferred from the execution context of the code generator 426.

For instance, the security policy encoder 550 may determine that the generated code is to be Java code based on a suitable configuration file or input parameter, that the network location is a web-based API such as web API 440, and that a specified security policy is to be implemented as an interceptor callback during HTTP client operations. An interceptor callback includes custom instructions that will be executed by an HTTP client before making a web request. In this example, the code generator 426 encodes the specified security policy into Java instruction that are suitable for use in an interceptor callback. The security policy definitions may be specified using pseudo-code, a suitable data specification language (DDL), a templating language, and so on. For instance, a simple example security check specified in pseudo-code may be:

function intercept (request):
  if request.getHeader("Authorization")!=AUTH_TOKEN:
    throw "Invalid authorization token"
  proceedWithRequest(request)

The security policy encoder 550 can use the security policy definitions 552 to encode the security policy into a suitable format for execution, such as converting into a programming language. For instance, the example pseudo-code above may be encoded into the Java or C++ programming languages. In some examples, the implementation of a security policy may be manually encoded into a particular language. That case, selection of a particular security policy may result in the direct insertion of the encoded program code into the client code under generation 422A . . . N.

In another example, the security policy can be specified in the specification using instructions in a code block. In this case, the instructions in the code block may need to be encoded into a format suitable for execution. For instance, the specification may include a Lua code block for executing a security policy. A simple example security check specified in Lua in a JSON specification may be:

. . . "securityPolicies": [
  {
    "policyScript": "function intercept (request)\n if request:getHeader('Authorization')~=AUTH_TOKEN then\n
    error('Invalid authorization token')\n end\n
    proceedWithRequest(request)\nend"
  }
] . . .

The specified Lua code block may be encoded into a format for embedding into C++ or Java code, or other suitable programming language by security policy encoder 550. For example, Java may provide a library for executing inline Lua code. Templates 542 may, in turn, include a substitutable portion for embedded arbitrary Java code for execution before or during an HTTP request. This outlines one possible implementation, but one of ordinary skill in the art will immediately see that this can be implemented in various ways.

The templating engine 540 receives the information extracted from the specification (e.g., HTTP elements 530), the encoded security policies from security policy encoder 550 and applies them to templates 542 to output generated client code 422A . . . N. As shown in FIG. 4, the generated client code 422A . . . N can be integrated into video conferencing client software, third-party applications, or other software that accesses web API 440 according to standardized organizational practices (e.g., business rules) and mandatory security policies. In another example, the specification of the API associated with the network location can be based on one or more business requirements such as response time constraints, data payload limits, authentication protocols, support for specific HTTP methods (e.g., GET, POST, PUT), endpoint versioning, rate limiting, error handling strategies, and so on.

Referring now to FIG. 6, FIG. 6 shows an example of a specification 600 of a network location. Example specification 600 is in the JSON format and refers to an HTTP-based web API, but other formats and types of APIs are compatible with the techniques disclosed herein. The example specification 600 includes a class name 605 that can be used to specify the name or prefix of the generated client code 422A . . . N or the generated test code 424A . . . N. For instance, if the class name 605 is "TestRequest" then the files or classes constituting the generated client code 422A . . . N may have names such as "TestRequestHttpClient.cpp" or "TestRequestAPIHandler.java" or be located in a folded named "TestRequest".

Specification 600 includes a request portion 610, as denoted with the bracketed block labeled with "request". The request portion 610 can include parameters for populating the templates 542 for generating client code 422A . . . N or test code 424A . . . N. Specification 600 likewise includes a response portion 620, as denoted with the bracketed block labeled with "response" that can be similarly used. In this example, the example request portion 610 includes nested fields that correspond to HTTP elements 530 that can populate variables in templates 542 by the templating engine 540. For instance, "request.form_data.name" may correspond to an element in semi-structured form data field in a template 542. L Likewise, "response.body.fields.Reponse.result" in the response portion 620 may correspond to a field in a template 542 for parsing the HTTP response and exposing its elements as attributes in a response object or similar means for providing access to the response in application code.

Specification 600 includes a security policies portion 630, as denoted with the bracketed block labeled with "security_policy". In example specification 600, the security policies portion 630 includes four example security policies and associated Boolean flags, in which "true" corresponds to inclusion of the security policy in the generated client code 422A . . . N and the associated generated test code 424A . . . N, and "false" corresponds to its omission. In some examples, omission of the particular flag may result in a default setting being applied. For example, the "add_org_cookie" flag may be configured to be included by default, even if the "true" flag is not included in specification 600.

The example security policies in security policy portion 630 include the "add_org_cookie" policy. Inclusion of this security policy can require inclusion of a cookie containing specified elements for a successful API request or transaction to occur. For example, if this security policy is enabled with a "true" flag, the generated client code 422A . . . N will automatically incorporate code to add the appropriate cookie but only under circumstances determined to be secure. For example, the generated client code 422A . . . N may be configured to only send the cookie to particular domains. Such a policy can ensure that authenticated requests are sent only to an organization's web services, safeguarding against the inadvertent transmission of sensitive information to third-party non-organizational web services.

The example security policies in security policy portion 630 include the "follow_same_origin" policy. This security policy can require HTTP clients to adhere to the same-origin policy. Specifically, in certain scenarios, the original request might be directed to an organization's web services, but the redirected service could be a third-party service. When configured to follow the same-origin policy, using, for example, the "follow_same_origin" in specification 600, the code generation process can automatically ensure that an organization's cookie containing sensitive data is not allowed to be carried during redirection. This security policy can prevent sensitive cookie information from being accessed by untrusted third-party services in cross-origin contexts.

The example security policies in security policy portion 630 may include a "need_prompt_cert" security policy. This security policy may require a user prompt to authorize an operation when presenting or selecting a client certificate for authentication. The "need_check_session_expired" security policy may require the client to verify if a session (e.g., the duration of time indicated by the expiration time of a session token or cookie) has expired before proceeding with a request. Many other security policies are possible and the ones shown in the example security policy portion 630 are just examples. Additionally, the security policy portion 630 can include pseudo-code, macros, scripts, or client code that specifies particular implementations for security policies.

Figure 7:
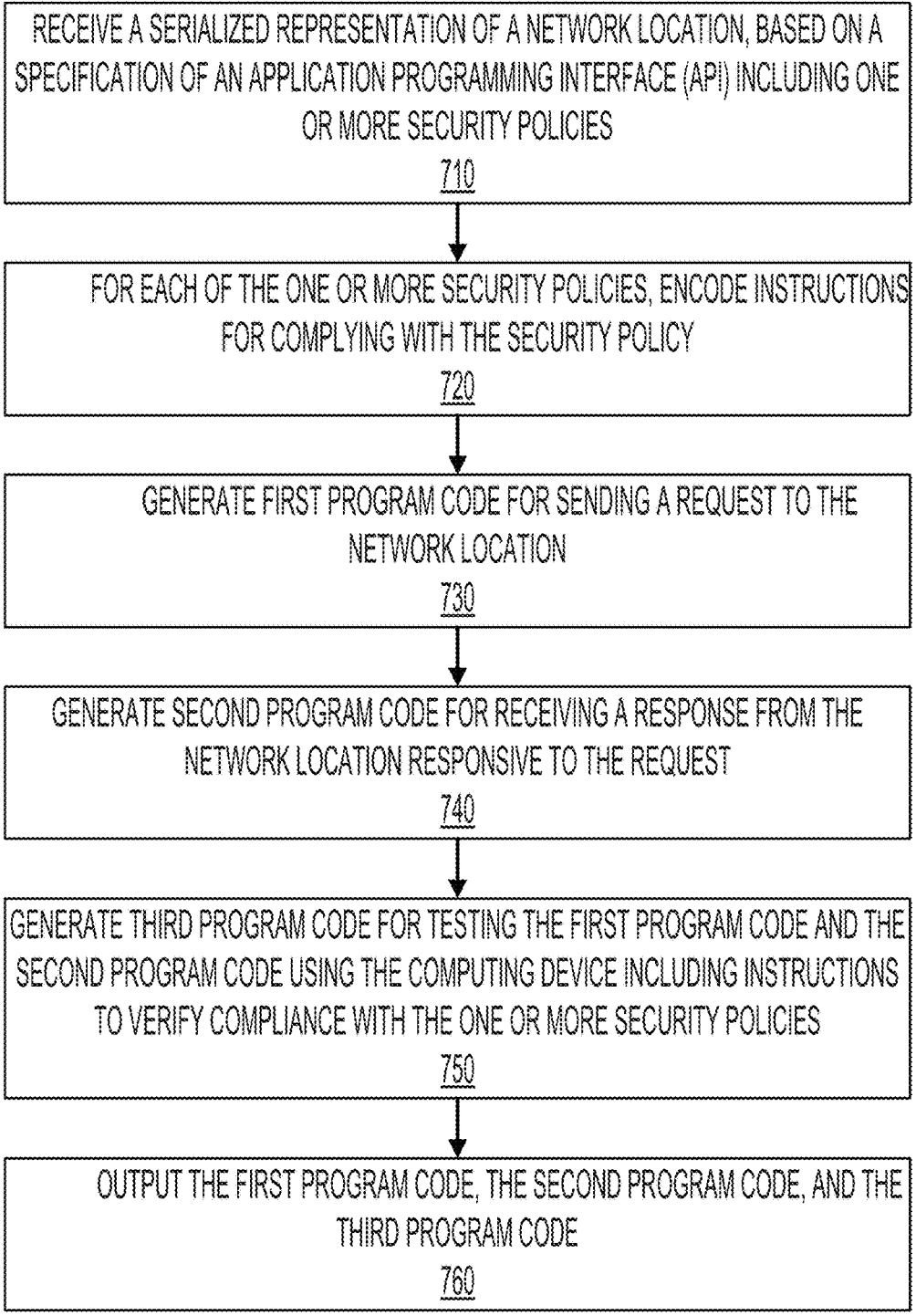
FIG. 7 shows a flowchart of an example method for client and test code generation of encoded security policies, according to some aspects of the present disclosure.

Referring now to FIG. 7, FIG. 7 shows a flowchart of an example method 700 for client and test code generation of encoded security policies. The description of the method 700 in FIG. 7 will be made with reference to FIGS. 4-6, however any suitable system according to this disclosure may be used, such as the example systems 100 and 200, shown in FIGS. 1 and 2. It should be appreciated that method 700 provides a particular method for providing name pronunciation for video conferences. Other sequences of operations may also be performed according to alternative examples. For example, alternative examples of the present disclosure may perform the steps outlined above in a different order.

Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. For example, the description is given from the perspective of the code generation subsystem 420 but other configurations are possible. One of ordinary skill in the art would recognize many variations, modifications, and alternatives.

The method 700 may include block 710. At block 710, a computing device configured for code generation receives a serialized representation of a network location, in which the serialized representation is based on a specification of an application programming interface (API) associated with the network location, including one or more security policies associated with the network location. For example, the network location may the endpoint of a web-based hypertext transfer protocol (HTTP) API. In a typical example, the specification may be based on API documentation or other similar specification of the API endpoint. For instance, the API documentation may include an endpoint such as a URL, a required HTTP method (e.g., GET or POST), required headers, required authentication procedures, and so on. The serialized representation of the specification contains the information needed by the code generation subsystem 420 shown in FIG. 4 to generate client code 422A . . . N and test code 424A . . . N.

Likewise, for an RPC-based API, the API documentation may include a service definition with a "proto" file, specifying RPC methods (e.g., unary, server streaming, etc.), message types, required metadata, and required authentication procedures. The serialized representation of the specification can again contain the information needed by the code generation subsystem 420 shown in FIG. 4 to generate client code 422A . . . N and test code 424A . . . N for an RPC-based API endpoint.

The specification includes one or more security policies associated with the network location. Security policies may be designated in the serialized representation using a Boolean flag, custom script code, macros, and or a combination thereof as shown in FIG. 6. At block 720, for each of the one or more security policies, the computing device encodes instructions for complying with the security policy. For instance, each security policy designated with a Boolean flag can correspond to a procedure that is encoded into a code block or snippet in a particular programming language suitable for use in generate client code 422A . . . N and test code 424A . . . N.

In some examples, security policies may be manually encoded ahead of time. In some examples, domain-specific tools can be used to translate domain-specific pseudo-code or high-level descriptions into actual code. In some other examples, code generation tools such as yacc, lex, or ANTLR can be used to with high-level descriptions to produce source code. In still some other examples, pseudo-code parsers can be used to parse pseudo-code and generate code in specific languages.

At block 730, the computing device generates first client code for sending a request to the network location, including the encoded security policy compliance code for each of the one or more security policies. For example, the computing device may generate C++ client code for inclusion in an HTTP client application that can be used for making a request to a web-based API. The client code 422A . . . N may be generated by applying the information extracted from the specification 510 (e.g., HTTP elements 530 as shown in FIG. 5) in the serialized representation to a template 542. The generated client code 422A . . . N may include components that can be integrated into existing software but may also be used as standalone, executable client code 422A . . . N. In some examples, the generated client code 422A . . . N may require additional configuration such as the setting of environment variables or the creation of configuration files to properly execute.

At block 740, the computing device generates second client code for receiving a response from the network location responsive to the request. For example, in addition to the instructions for sending an HTTP request, the generated client code may also include instructions for receiving, parsing, or processing of an HTTP response from the web-based API. In some examples, the response may be in a particular specified format, such as a binary, serialized format like protobuf.

The generated client code may be used to receive the HTTP response in the specified format and provide access to the data contained therein by application developers. For instance, if the specification 510 includes response attributes such as the ones shown in response section 620 in FIG. 6, the generated client code 422A . . . N may include a class or other function that exposes the response attributes as attributes or variables in that class. The generated response handling client code 422A . . . N may also include suitable error handling code when the web request results in both expected or unexpected errors.

At block 750, the computing device generates first test code for testing the first client code and the second client code using the computing device, including second instructions to verify compliance with the one or more security policies. For example, various functions of the generated client code 422A . . . N can be mirrored in generated test code 424A . . . N for verification of proper operation. For instance, the test generator 428 can be configured to mirror each operation in the generated client code 422A . . . N with an associated unit test. In some examples, test generator 428 can generate stub or mock classes or code to verify the proper and secure operation of generated client code 422A . . . N in unit tests. The test generator 428 can, in addition to the example of unit tests, generate functional tests, integration tests, performance tests, load tests, acceptance tests, end-to-end tests, and so on.

At block 760, the computing device outputs the first client code, the second client code, and the first test code. For example, the generated client code 422A . . . N may be saved to a memory device, printed, emailed, or otherwise conveyed to an application developer. The application developer can use the generated client code for rapid, secure application development that is compliant with the standards and security policies of a particular network location such as the organization administrating a web-based API. In some examples, the generated client code 422A . . . N or information about the generated client code 422A . . . N can be ephemerally persisted or cached such that subsequent operations of code generator 426 or test generator 428 are not performed unless a particular change is made to the API specification 510 or other circumstances. Computing resources can be thus conserved by not repeating code generation operations when they will merely repeat.

Figure 8:
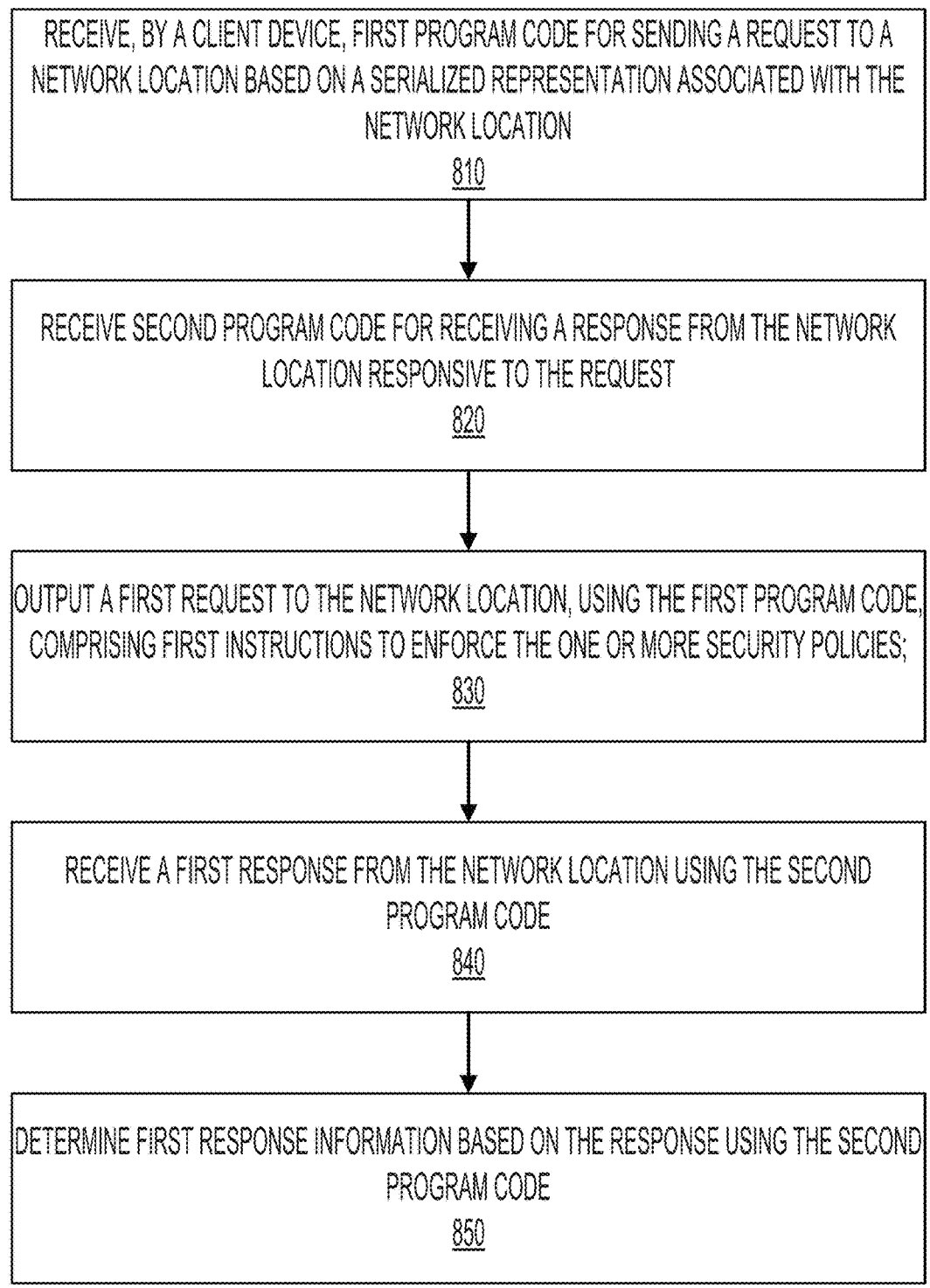
FIG. 8 shows a flowchart of an example method for client and test code generation of encoded security policies, according to some aspects of the present disclosure.

Referring now to FIG. 8, FIG. 8 shows a flowchart of an example method 800 for client and test code generation of encoded security policies. The description of the method 800 in FIG. 8 will be made with reference to FIGS. 4-6, however any suitable system according to this disclosure may be used, such as the example systems 100 and 200, shown in FIGS. 1 and 2. It should be appreciated that method 800 provides a particular method for providing name pronunciation for video conferences. Other sequences of operations may also be performed according to alternative examples. For example, alternative examples of the present disclosure may perform the steps outlined above in a different order.

Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. For example, the description is given from the perspective of the client device 408 but other configurations are possible. One of ordinary skill in the art would recognize many variations, modifications, and alternatives.

The method 800 may include block 810. At block 810, a client device 410 receives first client code for sending a request to a network location based on a serialized representation associated with the network location, in which the serialized representation is based on a specification of an application programming interface (API) associated with the network location, the specification including one or more security policies, each of the one or more security policies encoding instructions for enforcing the security policy. For instance, client device 410 may include video conferencing client software built using generated client code 422A . . . N for sending requests to web API 440 for various video-conferencing services.

Likewise, at block 820, the client device 410 receives second client code for receiving a response from the network location responsive to the request. The video conferencing client software built using generated client code 422A . . . N for receiving responses from web API 440 in response to requests for various video conferencing services.

At block 830, the client device 410 outputs a first request to the network location, using the first client code, including first instructions to enforce the one or more security policies. For example, the video conferencing client software executing on client device 410 can be used to participate in a video conference. The client device 410 may be caused by a user to communicate with video conference provider 402 via web API 440 to initiate the video conference and to send and receive video and audio streams, among other things, during the video conference. The generated client code 422A . . . N may include instructions that enable the client device 410 to, for example, initiate a video conference. In some examples, the developer of the video conference client software can seamlessly use the generated client code 422A . . . N, including the security provided by the security policies encoded using security policy encoder as shown in FIG. 5.

Likewise, at block 840, the client device 410 receives a first response from the network location using the second client code. For instance, in response to an API request to web API 440 to initiate a video conference, the video conference provider 402 may reply with information about the initiated video conference. The generated client code 422A . . . N executing on client device 410 can receive, parse, and transform the response into a suitable form for output of the video conference.

At block 850, the client device 410 determines first response information based on the response using the second client code. For example, the generated client code 422A . . . N may include client code for receiving the expected response and extracting the required information from it, along with methods and procedures for error handling. For example, the generated client code 422A . . . N may include client code to determine whether the video conference has been successfully created or not and to pass the appropriate indications to the video conferencing client software based on this outcome.

Figure 9:
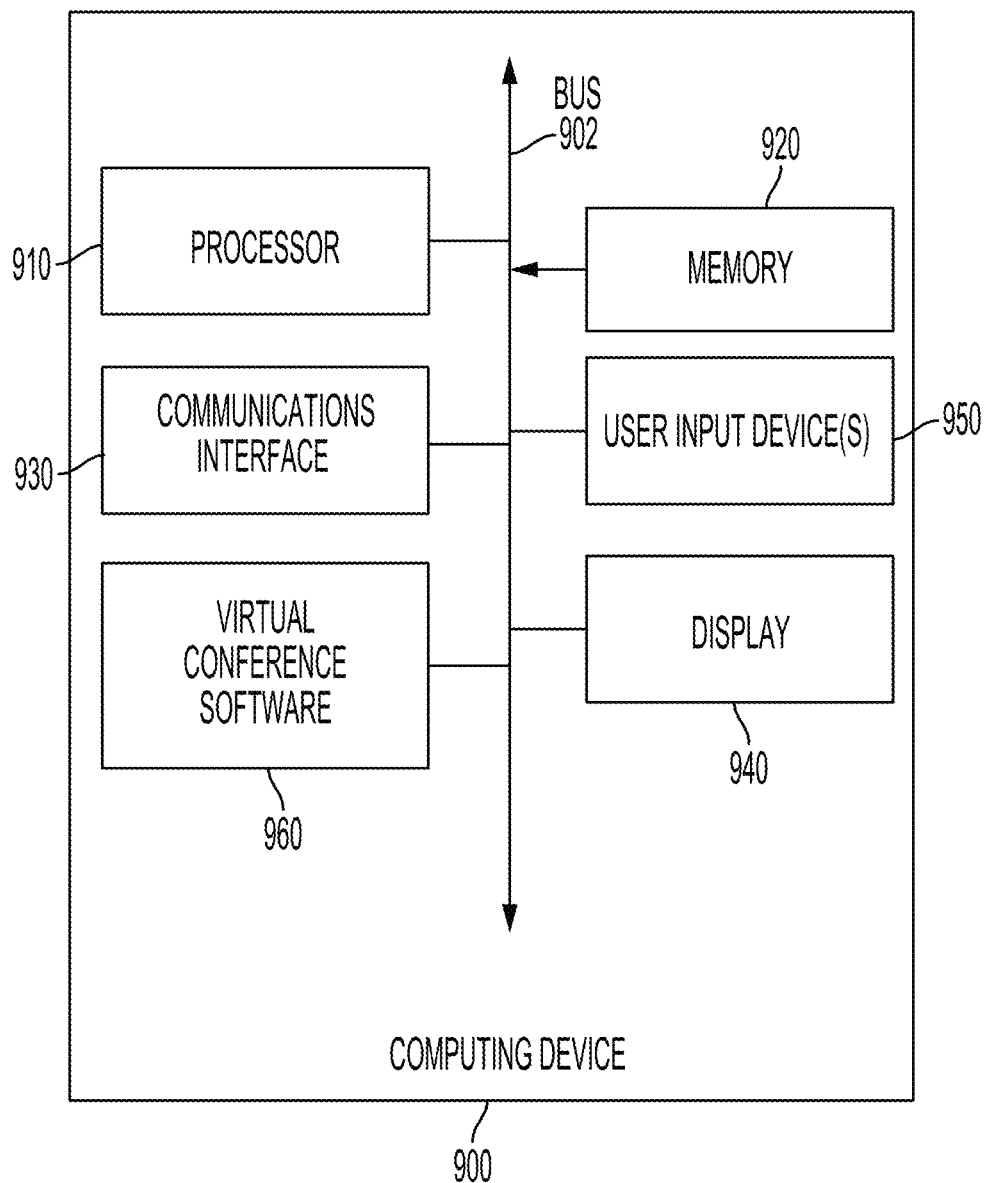
FIG. 9 shows an example computing device suitable for use in example systems or methods for providing client and test code generation of encoded security policies, according to some aspects of the present disclosure.

Referring now to FIG. 9, FIG. 9 shows an example computing device 900 suitable for use in example systems or methods for providing client and test code generation of encoded security policies according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for client and test code generation of encoded security policies according to different examples, such as part or all of the example methods 700 and 800 described above with respect to FIGS. 7 and 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes virtual conferencing software 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving, by a computing device configured for code generation, a serialized representation of a network location, wherein the serialized representation is based on a specification of an application programming interface (API) associated with the network location, comprising one or more security policies associated with the network location; for each of the one or more security policies, encoding, by the computing device, instructions for complying with the security policy; generating, by the computing device, first client code for sending a request to the network location, comprising the encoded security policy compliance code for each of the one or more security policies; generating, by the computing device, second client code for receiving a response from the network location responsive to the request; generating, by the computing device, first test code for testing the first client code and the second client code using the computing device, comprising second instructions to verify compliance with the one or more security policies; and outputting the first client code, the second client code, and the first test code.

Example 2 is the method of example(s) 1, wherein the serialized representation comprises a structured data format.

Example 3 is the method of example(s) 1, wherein the first test code comprises a unit test that executes that the first client code and verifies a particular response using the second client code.

Example 4 is the method of example(s) 1, wherein the network location is a hypertext transfer protocol (HTTP) uniform resource locator (URL).

Example 5 is the method of example(s) 4, wherein the serialized representation comprises an HTTP request section, comprising a domain, a path, and an HTTP request method.

Example 6 is the method of example(s) 5, wherein the HTTP request section further comprises at least one of one or more HTTP headers, one or more HTTP cookies, or an HTTP request form data.

Example 7 is the method of example(s) 4, wherein the serialized representation comprises an HTTP response section, comprising a response specification.

Example 8 is the method of example(s) 7, wherein the response specification is based on a binary serialization format.

Example 9 is the method of example(s) 1, wherein the one or more security policies include a cookie inclusion policy.

Example 10 is the method of example(s) 1, wherein the one or more security policies include a same-origin policy.

Example 11 is the method of example(s) 1, wherein the first client code, the second client code, and the first test code are generated using one or more templates, wherein the one or more templates comprise a plurality of parameters associated with a corresponding plurality of values in the serialized representation.

Example 12 is the method of example(s) 1, wherein the specification of the API associated with the network location is based on one or more business requirements.

Example 13 is the method of example(s) 1, wherein the specification of the API associated with the network location is generated based on API documentation.

Example 14 is a non-transitory computer-readable medium storing instructions that, when executed by one or more processors, cause the one or more processors to perform operations including: receiving, by a computing device configured for code generation, a serialized representation of a network location, wherein the serialized representation is based on a specification of an application programming interface (API) associated with the network location, comprising one or more security policies associated with the network location; for each of the one or more security policies, encoding, by the computing device, instructions for complying with the security policy; generating, by the computing device, first client code for sending a request to the network location, comprising the encoded security policy compliance code for each of the one or more security policies; generating, by the computing device, second client code for receiving a response from the network location responsive to the request; generating, by the computing device, first test code for testing the first client code and the second client code using the computing device, comprising second instructions to verify compliance with the one or more security policies; and outputting the first client code, the second client code, and the first test code.

Example 15 is the non-transitory computer-readable medium of example(s) 14, wherein the serialized representation is based on JavaScript Object Notation (JSON).

Example 16 is the non-transitory computer-readable medium of example(s) 14, wherein: the network location is a hypertext transfer protocol (HTTP) uniform resource locator (URL); and the serialized representation comprises: an HTTP request section, comprising a domain, a path, and an HTTP request method; at least one of one or more HTTP headers, one or more HTTP cookies, or an HTTP request form data; and an HTTP response section, comprising a response specification.

Example 17 is the non-transitory computer-readable medium of example(s) 16, wherein the response specification is based on the binary serialized protobuf format.

Example 18 is a system comprising: one or more processors; and one or more computer-readable storage media storing instructions which, when executed by the one or more processors, cause the one or more processors to perform operations including: receiving, by a computing device configured for code generation, a serialized representation of a network location, wherein the serialized representation is based on a specification of an application programming interface (API) associated with the network location, comprising one or more security policies associated with the network location; for each of the one or more security policies, encoding, by the computing device, instructions for complying with the security policy; generating, by the computing device, first client code for sending a request to the network location, comprising the encoded security policy compliance code for each of the one or more security policies; generating, by the computing device, second client code for receiving a response from the network location responsive to the request; generating, by the computing device, first test code for testing the first client code and the second client code using the computing device, comprising second instructions to verify compliance with the one or more security policies; and outputting the first client code, the second client code, and the first test code.

Example 19 is the system of example(s) 18, wherein the one or more security policies include a cookie inclusion policy or a same-origin policy.

Example 20 is the system of example(s) 18, wherein the first client code, the second client code, and the first test code are generated using a plurality of text-based templates, wherein: the plurality of templates comprise templates from a plurality of programming languages; and each template of the plurality of templates includes at least a client code portion and a test code portion.

That which is claimed is:

1. A method, comprising:
receiving, by a computing device configured for code generation, a serialized representation of a network location, wherein the serialized representation is based on a specification of an application programming interface (API) associated with the network location, comprising one or more security policies associated with the network location;

for each of the one or more security policies, encoding, by the computing device, instructions for complying with the security policy;
generating, by the computing device, first client code for sending a request to the network location, comprising the encoded security policy compliance code for each of the one or more security policies;
generating, by the computing device, second client code for receiving a response from the network location responsive to the request;
generating, by the computing device, first test code for testing the first client code and the second client code using the computing device, comprising second instructions to verify compliance with the one or more security policies; and
outputting the first client code, the second client code, and the first test code.

2. The method of claim 1, wherein the serialized representation comprises a structured data format.

3. The method of claim 1, wherein the first test code comprises a unit test that executes that the first client code and verifies a particular response using the second client code.

4. The method of claim 1, wherein the network location is a hypertext transfer protocol (HTTP) uniform resource locator (URL).

5. The method of claim 4, wherein the serialized representation comprises an HTTP request section, comprising a domain, a path, and an HTTP request method.

6. The method of claim 5, wherein the HTTP request section further comprises at least one of one or more HTTP headers, one or more HTTP cookies, or an HTTP request form data.

7. The method of claim 4, wherein the serialized representation comprises an HTTP response section, comprising a response specification.

8. The method of claim 7, wherein the response specification is based on a binary serialization format.

9. The method of claim 1, wherein the one or more security policies include a cookie inclusion policy.

10. The method of claim 1, wherein the one or more security policies include a same-origin policy.

11. The method of claim 1, wherein the first client code, the second client code, and the first test code are generated using one or more templates, wherein the one or more templates comprise a plurality of parameters associated with a corresponding plurality of values in the serialized representation.

12. The method of claim 1, wherein the specification of the API associated with the network location is based on one or more business requirements.

13. The method of claim 1, wherein the specification of the API associated with the network location is generated based on API documentation.

14. A non-transitory computer-readable medium storing instructions that, when executed by one or more processors, cause the one or more processors to perform operations including:
receiving, by a computing device configured for code generation, a serialized representation of a network location, wherein the serialized representation is based on a specification of an application programming interface (API) associated with the network location, comprising one or more security policies associated with the network location;

for each of the one or more security policies, encoding, by the computing device, instructions for complying with the security policy;
generating, by the computing device, first client code for sending a request to the network location, comprising the encoded security policy compliance code for each of the one or more security policies;
generating, by the computing device, second client code for receiving a response from the network location responsive to the request;
generating, by the computing device, first test code for testing the first client code and the second client code using the computing device, comprising second instructions to verify compliance with the one or more security policies; and
outputting the first client code, the second client code, and the first test code.

15. The non-transitory computer-readable medium of claim 14, wherein the serialized representation is based on JavaScript Object Notation (JSON).

16. The non-transitory computer-readable medium of claim 14, wherein:
the network location is a hypertext transfer protocol (HTTP) uniform resource locator (URL); and
the serialized representation comprises:
an HTTP request section, comprising a domain, a path, and an HTTP request method;
at least one of one or more HTTP headers, one or more HTTP cookies, or an HTTP request form data; and
an HTTP response section, comprising a response specification.

17. The non-transitory computer-readable medium of claim 16, wherein the response specification is based on the binary serialized protobuf format.

18. A system comprising:
one or more processors; and
one or more computer-readable storage media storing instructions which, when executed by the one or more processors, cause the one or more processors to perform operations including:
receiving, by a computing device configured for code generation, a serialized representation of a network location, wherein the serialized representation is based on a specification of an application programming interface (API) associated with the network location, comprising one or more security policies associated with the network location;
for each of the one or more security policies, encoding, by the computing device, instructions for complying with the security policy;
generating, by the computing device, first client code for sending a request to the network location, comprising the encoded security policy compliance code for each of the one or more security policies;
generating, by the computing device, second client code for receiving a response from the network location responsive to the request;
generating, by the computing device, first test code for testing the first client code and the second client code using the computing device, comprising second instructions to verify compliance with the one or more security policies; and
outputting the first client code, the second client code, and the first test code.

19. The system of claim 18, wherein the one or more security policies include a cookie inclusion policy or a same-origin policy.

20. The system of claim 18, wherein the first client code, the second client code, and the first test code are generated using a plurality of text-based templates, wherein:
- the plurality of templates comprise templates from a plurality of programming languages; and
- each template of the plurality of templates includes at least a client code portion and a test code portion.

\* \* \* \* \*